Nov. 21, 1939.      J. H. K. McCOLLUM ET AL      2,180,537
MOTOR VEHICLE CLUTCH CONTROL MECHANISM
Original Filed Jan. 17, 1931
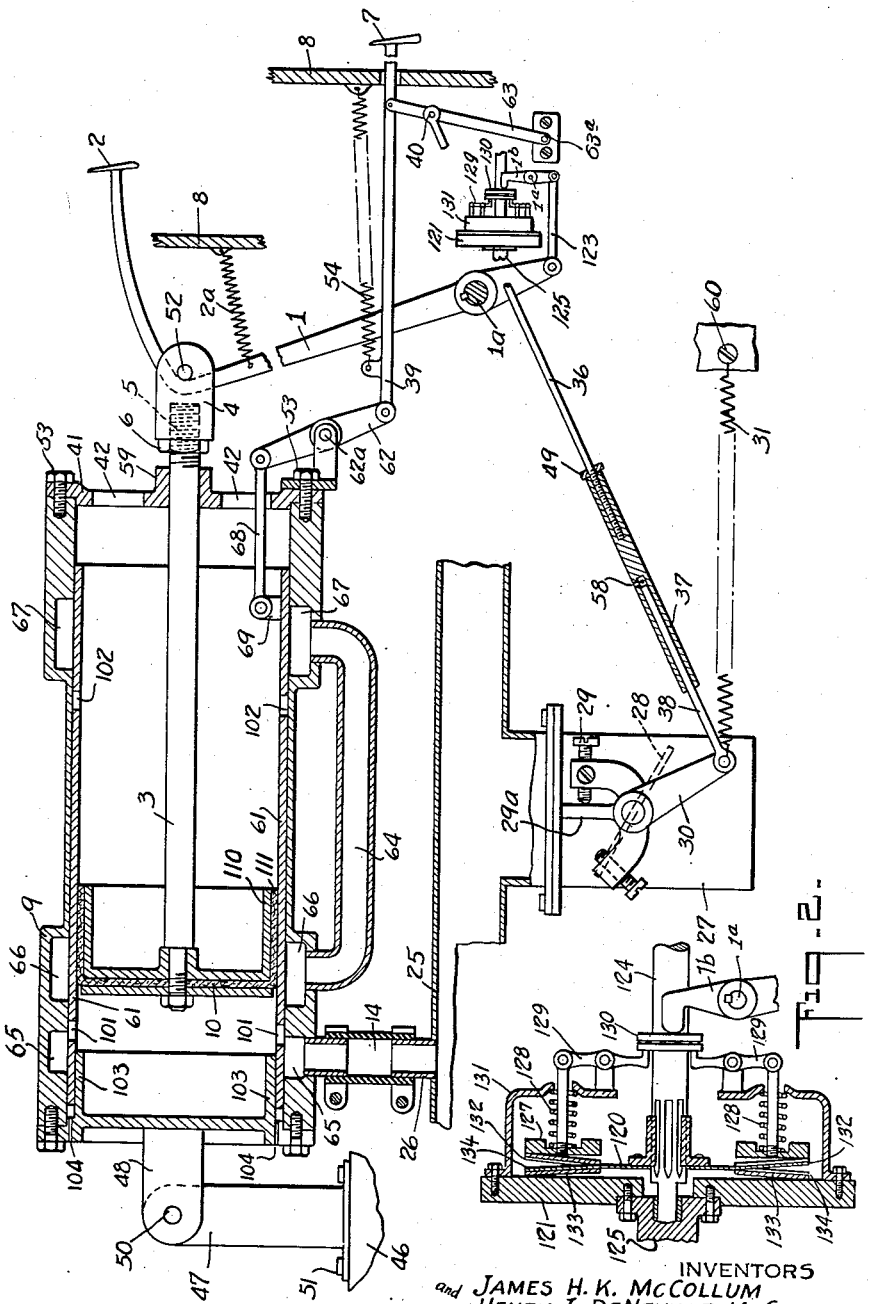
INVENTORS
JAMES H. K. McCOLLUM
and HENRY J. DeNEVILLE McCOLLUM
BY
ATTORNEY Patented Nov. 21, 1939

2,180,537

UNITED STATES PATENT OFFICE 2,180,537

MOTOR VEHICLE CLUTCH CONTROL MECHANISM

James H. K. McCollum and Henry J. De N. McCollum, Evanston, Ill.

Original application January 17, 1931, Serial No. 509,310. Divided and this application April 23, 1936, Serial No. 76,054

24 Claims. (Cl. 192—.01)

This application is a division of our application Serial No. 509,310, filed January 17, 1931, and relates more particularly to that modification of the underlying principles of our broad invention which is illustrated in Fig. 3 of said parent application, omitting, however, the leakage port 56 therein shown which we stated in the original specification of such application might be dispensed with.

In that application we illustrated and described several forms of mechanism each of which would automatically produce a two-stage, clutch-closing movement in a power-operated clutch-actuated apparatus, and each of which disclosed the use of a small leakage port there numbered 56 for so controlling the flow of air in the pneumatic servo-motor shown as to cause a second, or final, stage of closing movement of the clutch parts which would be considerably slower than the first part thereof, the general purpose being to slow down the speed of the clutch-closing operation at or about the time when the initial engagement of the clutch faces occurs.

In said Fig. 3 of such parent application the first and more rapid stage of clutch closure was checked by the driver stopping at the proper time the movement of the accelerator which was being pressed downward to open the throttle, and then holding it stationary until the piston of the pneumatic servo-motor actuating the clutch had moved far enough through a sleeve valve member there shown and also controlled by the accelerator to shut off free access of air to the vacuum behind the piston; after which further piston movement would be reduced to a speed permitted by the restricted access of air to said vacuum space through such port 56, unless and until said sleeve which was reciprocable by the accelerator, was moved by shifting the latter so as to again permit free inflow of air for a time. Thus the clutch-closing movement was largely controllable by the operator simultaneously with and according to, the degree of opening of the throttle,—which also, of course, was controlled by such accelerator.

When the leakage port 56 is dispensed with, as in the present application, any automatically-produced slower, second stage of clutch-closing movement is reduced to such very slow movement as may result from leakage, occurring mainly between the slide-valve surfaces, and the degree of the accelerator's control of the clutch throughout the closing movement of the latter is heightened to an extent which practically duplicates the accuracy of its control of the throttle. Consequently the degree of friction between the clutch plates (or "loading" of the clutch) at various stages of throttle opening may be adjusted in approximately direct proportion to the power being developed by the engine, which roughly corresponds to the torque applied to the engine shaft and transmitted by the clutch.

The present application is drawn to cover an apparatus of the last above outlined type in which the described desired result is secured by the use of a two-part valve, one part of which is manually controlled (as by the usual accelerator) while the other and cooperating part is automatically controlled by the movement of the servo-motor actuating the clutch, and thereby caused to follow up movements of the first part and so shut off access of air to the servo-motor whenever the movement of the accelerator is stopped in a position of partial throttle opening, thereby retarding and substantially checking further clutch-closing movement until the accelerator's position is further shifted and a different degree of throttle opening effected.

In the accompanying drawing

Fig. 1 shows a sectional view of a power-operated clutch-actuating apparatus embodying one form of our invention illustrated somewhat diagrammatically as mounted on a portion of the chassis of a motor car, shown broken away. Said apparatus is shown as connected to a clutch-operating lever, an accelerator pedal and an intake manifold of a motor car, said parts being also broken away and the clutch being shown in outline.

Fig. 2 shows a vertical section on a larger scale of the conventional form of clutch shown in outline in Fig. 1.

Referring to Fig. 1, the usual clutch pedal of a motor car is indicated at 2, a portion of the chassis of which is shown at 46. This pedal is mounted on the clutch lever 1, which is keyed to the clutch-operating shaft 1a and normally held in a clutch-engaging position by the tension of the spring 2a.

In the conventional form of clutch shown in detail in Fig. 2 disk 121 (which is also the engine fly wheel) carries a ring casing 131 within which the thin sheet-steel disk 120 is concealed, together with an annular pressure plate 127 normally forced toward 121 by springs 128 so as to clamp disks 120 and 121 together and thereby close the clutch. 1b indicates the release fork fast on shaft 1a and acting on thrust ball bearing 130 which is loose on drive shaft 124 of the transmission mechanism (not shown) on which disk 120 is fast. The lefthand half of such ball bearing is carried by the link mechanism generally indicated by 129 which withdraws pressure plate 127 from operative engagement with disk 120 whenever pedal 2 moves to the left, thus opening the clutch against the resistance of springs 128. The disk 120 is preferably made of spring steel and slotted radially near its periphery at a plurality of points to form oppositely bent, slightly flexible tabs 134, 132. Tabs 134, which are bent toward the engine fly wheel 121, carry a slightly compressible facing ring 133, while tabs 132, which are bent toward pressure plate 127 carry another similar cooperating facing ring, these two forming the usual renewable clutch lining.

In the operation of this form of clutch the release fork 1b when swung in a clockwise direction, by spring 2a, acting on lever 1, permits springs 128 to close the clutch by forcing pressure plate 127 toward the fly wheel 121, thus bending tabs 134 and 132 into line one with another by compression on facings 133, and thereby clamping disk 120 to the engine fly wheel 121, so that the whole mechanism shown in Fig. 2 revolves with the engine shaft so long as the load on the transmission shaft is not great enough to cause clutch slipping. When, however, clutch lever 1 is swung to the left, pressure transmitted by release fork 1b through ball bearing 130 withdraws pressure plate 127 from contact with the clutch facing 133 on tabs 132 and opens the clutch (wholly or partly according to the extent of such lever movement), thus permitting the engine fly wheel to revolve with only a slight drag on it from clutch friction, or none at all. These clutch pedal movements can be produced by foot pressure or automatically by the power mechanism shown in the drawings and which may be described as follows:

25 is a section of the intake manifold of the motor to which the combustible mixture is admitted through the carburetor 27 having a throttle valve 28 of the usual butterfly type operated by the throttle lever 30 and limited in its movements by the adjustable stop mechanism 29 cooperating with the fixed stop rib 29a. This throttle valve is normally held in nearly closed or idling position by the spring 31 anchored at 60. It can be opened by motion of the pedal 7 mounted on rod 39 projecting through footboard 8 and having a pivotal connection to lever 63 which is connected at 40 to the accelerator rod 36 which has a lost motion connection to the throttle rod 38 which is pivoted to the throttle lever 30. The cup-shaped sleeve 37 is adjustably mounted on the end of the rod 36 by means of the screw thread connection there shown and can be locked in any position of adjustment by the lock-nut 49. Throttle rod 38 slides in this sleeve and when the pedal 7 is fully retracted by the action of the spring 54, there is a gap left between the end of rod 38 and the bottom of cup-shaped sleeve 37. Ports 58 admit air to this space so as to permit free movement of the parts. When the pedal 7 is forced by the operator's foot toward the left the first action will be to take up the lost motion and thereafter subsequent movement of the pedal will cause opening movement of the throttle valve.

The power mechanism for operating the clutch comprises the vacuum cylinder or casing 9 which is pivotally mounted on the chassis 46 by means of the pedestal 47 fastened to the chassis by screw bolts 51, and the lug 48 projecting beyond the closed end of the cylinder and hinged or pivoted to the pedestal 47 at 50.

In the cylindrical casing 9 is the reciprocable sleeve 61 within which slides the piston 10 rigidly connected to the piston rod 3 which projects outwardly through perforated boss 59 in the skeleton cylinder head 41 which is provided with ports 42 and held in the open end of the cylinder by stove bolts 53. On the outer end of the piston rod 3 is the screw thread 5 by means of which it is adjustably connected to the fork 4 which carries the pin 52 in its open end, forming a pivotal connection with the pedal lever 1. There is a lock-nut 6 on the piston rod.

The intake manifold 25 is connected through conduit 26 to annular port casing 65 located near the closed end of the casing 9 and surrounding the end of the sleeve 61 and the ports 101 in said sleeve when it is in the lefthand position shown. 66 is another annular port casing adjacent casing 65, also surrounding the sleeve 61 and connected by conduit 64 to a third annular port casing 67 located near the open end of the cylindrical casing 9 and also surrounding the sleeve 61, and also surrounding ports 102 in said sleeve whenever it has been moved to the right a certain distance. Reciprocating motion is given to the sleeve by means of the link 68 pivoted to the lug 69 on the sleeve interior, said link being pivoted at its other end to one extremity of the lever 62 which oscillates on a fixed pivot 62a. The other arm of lever 62 is connected to the valve rod 39. By this chain of mechanism all movements of the pedal 7 are reversed and transmitted to the valve sleeve 61. A reduced motion of accelerator rod 36, as compared with that of sleeve 61, results from connecting the former to a lever 63 at an intermediate point of said lever which has one end mounted on a fixed pivot 63a and the other end connected to valve rod 39, as shown.

With the parts in the position shown, the clutch is fully disengaged. As the pedal 7 is depressed the sleeve 61 is moved to the right by means of the rod 39, lever 62 moving on fixed pivot 62a, connecting link 68, and lug 69 on said sleeve valve 61. This disconnects the ports 101 from the port casing 65 and from the manifold 25. A sufficient movement in this direction connects ports 101 with the port casing 66 and at the same time causes the ports 102 to register more or less completely with the port casing 67. This disconnects the interior of cylindrical casing 9 from the vacuum in the intake manifold 25, and connects the same parts of the interior of casing 9 and sleeve 61, i. e. those parts to the left of the piston 10, to the atmosphere by means of the ports 101, port casing 66, conduit 64, port casing 67, ports 102 and ports 42 in the skeleton casing head 41, thus allowing piston 10 to move rapidly to the right under the pull of the clutch springs until said piston laps and closes the ports 102. When the piston thus closes the ports 102 the parts of the interiors of casing 9 and sleeve 61 at the left of the piston 10 are thereby automatically disconnected from the atmosphere, and a partial vacuum sufficient to retard the further motion of the piston to the right is formed in that space to the left of the piston. This partial vacuum is formed entirely by the pull of clutch springs 2a on the piston.

The port casings 65, 66 and 67 are in the form of annular grooves in the interior walls of the cylindrical casing 9 and really form annular ports in said walls, to which conduits 26 and 64 are connected, and with which the reciprocating sleeve valve 61 cooperates.

In this construction it is important to prevent leakage of air around the lefthand end of sleeve 61 and for this purpose the head of casing 9 is provided with an internal annular lip 103 which fits closely into the end of sleeve 61, as there shown. We have also shown at 104, 104, air ports in the casing head opening into the annular space or pocket so formed to permit air to enter, or be discharged from, it and so balance at all times the atmospheric pressure exerted against the other end of said sleeve.

Casing 9 and sleeve 61 together form the equivalent of the simple cylinder of a servo-motor in which a piston like 10 reciprocates under fluid pressure-differential action. Sleeve 61 also serves as the main element of the valve controlling such a servo-motor and usually located outside such cylinder.

The rubber hose section 14 which connects the two sections of conduit 26, will not collapse even under the maximum partial vacuum created in it, if made with thick walls, such as are now common in the hose used on tire pumps, and will allow a slight oscillation of cylinder casing 9 on its pivot 50.

The connection from accelerator 7 to sleeve 61 and to throttle lever 30 may be variously adjusted so as to cause initial closing of port 102 at various degrees of throttle opening, and the effective length of piston rod 3 may be adjusted at the threaded connection 4, 5, to the clutch lever so as to vary within limits the time of such throttle opening and port closing with reference to the contemporaneous degree of clutch closure. As at present advised we prefer to so adjust the piston rod connection with respect to the throttle connection (36, 37, 38) that when the accelerator is stopped at the point when the throttle valve is just beginning to open, piston 10 will be just on the point of closing port 102 and the initial, light contact between clutch disks 120 and 121 will be beginning. This may be called the "cushioning" position of the parts, the elastic tabs 131, 132 on disk 120 being only slightly flexed, if at all.

There then will be practically no load on the clutch and practically none on the engine, so that the cracked throttle may spin the engine without burning the clutch, and thus cause the engine to acquire sufficient momentum to overcome any stalling tendency when thereafter the throttle is opened a little wider and the clutch is loaded a little more heavily to start the car into rather slow motion, usually with the first speed gear in mesh. This rate of motion, however, gives the car enough momentum to keep it moving while the clutch is temporarily pulled out of engagement (the throttle being simultaneously closed) and the shift to second gear is made preparatory to a further acceleration of the speed of the car,—and so on until the desired gears have been put in mesh.

Whenever the accelerator has been pushed far enough to the left to give the throttle an effective opening of about three-quarters of its maximum, or more, sleeve 61 will usually have been pulled so far to the right that the clutch will have reached nearly maximum loading by the time piston 10 has moved up to close port 102 in its position then reached, and if the car is thereafter operated for some time on less than full throttle opening, the clutch will leak on to full loading in a comparatively few seconds.

Whenever the accelerator is pushed all the way to the left and the throttle is thereby opened to the limit, sleeve 61 will have been drawn so far to the right that piston 10 can not reach port 102 even when said piston is in its full, final clutch-loading position.

In working the car out of a close parking berth the throttle would be first barely cracked and the engine warmed up with the clutch slipping freely as above described. Next the throttle would be opened further and the clutch correspondingly loaded a little and then be automatically held in that position by piston 10 having moved far enough to the right to have closed port 102. This would soon move the car slowly forward or backward the desired number of feet and/or inches, the clutch would then be released, the gear reversed and that familiar series of operations repeated with successive crampings of the steering gear until the car is swung to a position from which it can just move by the obstacle before it. Then as the slow, cracked-throttle-produced movement carries it safely out of the berth and past the obstruction further pressure on the accelerator instantly produces further loading of the clutch by another opening of port 102, which is automatically limited by the consequent follow-up movement of the piston 10,—while a burst of power from the simultaneously unthrottled engine sends the car rapidly out into the street.

Among the advantages of the invention may be mentioned the prevention of engine stalling in car starting, this resulting from the automatic limiting of the clutch loading proportionately to the power delivered by the engine so that the clutch will slip just before the engine stalls at a given throttle opening; together with the accurate control by the operator of the clutch loading at any moment so that its ultimate complete closure may follow a step-by-step progressive movement of the parts closely simulating that produced by an expert driver's manipulation of an ordinary clutch pedal.

The lefthand end of the sleeve 61 and port 101 therein, cooperating alternately with the annular port casings 65 and 66, constitute control means operative upon movement of the engine throttle to idling position for rendering the servo-motor operative as a power device for disengaging the clutch, and operative on movement of the throttle toward open position for successively releasing the clutch elements for movement toward operative (i. e. clutch-closed) position. As shown in Fig. 1 the piston structure 10 has an elongated head formed by the cylindrical lip 110 surrounded by an extended lip 111 of its packing and these two elements together form a cylindrical slide valve, cooperating with port 102 near the other end of sleeve 61 to form a valve means controlling inflow of air to port housing 66 and automatically preventing access of air thereto from time to time, thus becoming operative for checking the movement of the movable clutch element at a point prior to complete operative engagement of the clutch, and then, if sleeve 61 is moved further to the right, such valve means also becomes operative for further releasing the clutch elements for movement into complete operative engagement, or further toward such operative engagement.

After any one of such motion-checking actions said control means is further automatically operative for checking the closing movement of such elements at progressively later points thereof in accordance with the progressively greater opening movements of the engine throttle.

The entire piston head structure shown is thus really composed of two elements rigidly interconnected so as to move together. One of these is the rear, disc-portion of such piston structure, which is a part of the pressure responsive power device connected to the motor vehicle clutch and operative for moving the clutch elements out of engagement whenever a sufficient low air pressure (i. e. a partial vacuum) is formed in the left hand end of the power cylinder. The other element is the forwardly extending lip 110 which with the portion of packing 111 surrounding it constitute a cylindrical valve cooperating with port 102 in sleeve valve 61, and movable in accordance with the degree of actuation of the power device.

The described construction thus constitutes a pair of cooperating valves, one (sleeve 61) movable during the greater portion of its cycle of operations in accordance with the position of the engine throttle, and the other (the cylindrical portion 110 of the piston head) movable in accordance with the degree of actuation of the power device.

The outer cylinder 9 is not only a part of the power device, but is also a valve casing in which is contained the two-part valve formed by the cylindrical portion 110 of piston 10 and sleeve 61 with its port 102.

As the engine torque usually increases with the degree of throttle opening, the control means formed by piston 10 and port 102 in sleeve 61 is operative through a range of movement of the engine throttle adjacent the idling position thereof for releasing pressure to become effective in loading the clutch plates substantially in proportion to the engine torque exerted from time to time.

As before stated, sleeve 61 with its port 102 may be regarded as a valve movable in accordance with the position of the engine throttle and the cylindrical portion 110 of piston 10 may similarly be regarded as a cooperating valve movable in accordance with the operating status of the power device, such second valve being biased toward the right by the clutch springs and progressively releasable for movement in that biased direction as a result of the admission of air behind it from time to time as sleeve 61 is moved to the right by the accelerator movement far enough to successively open port 102 and connect the power device with the atmosphere, each such connection to the atmosphere tending to move the piston into a neutral position with respect to the sleeve to close again port 102 and thereby disconnect the power device from the atmosphere, thus checking any immediately preceding release of the parts toward closing of the clutch elements.

Also the disc portion of piston 10 located within cylindrical casing 9, and the associated mechanism, constitute a fluid pressure power device having means, (i. e. the piston) responsive to differential pressure therein connected to the operative member of the clutch which, under the action of the usual clutch springs, has a normal bias to operative position, and the left-hand end of sleeve 61 with its port 101 and port housings 65 and 66 constitute a control valve mechanism operative to one position for establishing differential pressure in said power device and to another position for releasing said power device to permit the clutch to return to normal position. Also port 102 controlled by the differential pressure responsive means (piston 10) of said power device is operative thereby for retarding movement of the clutch elements as they approach operative (i. e. engaged) position.

Having described our invention, we claim:

1. Apparatus of the character described comprising a fluid pressure power device having means responsive to differential pressure therein connected to the operative member of a motor vehicle clutch having a normal bias to operative position, and a control valve mechanism operative to one position for establishing differential pressure in said power device and to another position for releasing said power device to permit the clutch to return to normal position, said valve mechanism being provided with a port controlled by the differential pressure responsive means of said power device and operative thereby for retarding movement of the clutch elements as they approach operative position.

2. A combination such as defined in claim 1 in which said control valve mechanism comprises a reciprocable sleeve, in and through the wall of which said port controlled by the differential pressure responsive means is formed.

3. A combination such as defined in claim 1 in which said control valve mechanism comprises a manually reciprocable sleeve in and through the wall of which said port controlled by the differential pressure responsive means is formed, said sleeve being operatively connected to the accelerator of the car so that its reciprocations substantially conform to those of said accelerator.

4. A combination such as defined in claim 1 in which said differential pressure responsive means comprises an axially reciprocable member the movements of which control in part the opening and closing of said port.

5. A combination such as defined in claim 1 in which said means responsive to differential pressure comprise a piston head and piston rod, and in which said control valve mechanism comprises a cylindrical lip on said piston head and a reciprocable sleeve in, and through, the walls of which said port is formed and in which said piston head and lip are reciprocable in such manner that the movement of the latter controls in part the opening and closing of said port.

6. A combination such as defined in claim 1 in which said power device comprises a cylinder and piston and in which the control of said port is synchronous with certain movements of said piston.

7. A combination such as defined in claim 1 in which said control valve mechanism comprises a fixed casing having one opening connected with said power device and another connected with the intake manifold of the motor car, a sleeve with a port in its walls reciprocable endwise past said casing openings and a substantially cylindrical member reciprocable endwise in said sleeve and cooperating with a port therein to control the flow of air through said sleeve, one of said last two mentioned members being manually reciprocable and the other being automatically reciprocable contemporaneously with movements of said power device.

8. A combination such as defined in claim 1 in which said control valve mechanism comprises a casing having a port adapted to be connected to the intake manifold and a second port adapted to be connected to the atmosphere, together with a cylindrical valve manually reciprocable endwise of said casing and having a port formed in and through its wall permanently connected to said power device and adapted to be registered alternately with said casing ports by its reciprocation, in addition to the before-recited port which is controlled by differential pressure responsive means and which is openable to the atmosphere, said two sleeve ports being connected when the first one does not register with the first casing port but does register with the second casing port.

9. Clutch-operating mechanism for motor vehicles including a clutch and a throttle for the vehicle engine comprising a power device connected to the vehicle clutch, and control means operative upon movement of the engine throttle to idling position for rendering the power device operative for disengaging the clutch, and operative upon movement of the throttle toward open position for successively releasing the clutch elements for movement toward operative engagement, checking the movement of the clutch elements at a point prior to operative engagement, and then further releasing the clutch elements for movement into operative engagement, said control means being operative for checking the movement of the clutch elements at progressively later points in accordance with the progressively more rapid opening movement of the engine throttle.

10. Clutch-operating mechanism for motor vehicles including a clutch and a throttle for the vehicle engine comprising a power device connected to the vehicle clutch, control means operative upon movement of the engine throttle to idling position for rendering the power device operative for disengaging the clutch, and operative upon movement of the throttle toward open position for successively releasing the clutch elements for movement toward operative engagement, checking the movement of the clutch elements at a point prior to operative engagement, and then further releasing the clutch elements for movement into operative engagement, and means for causing the checking of the movement of the clutch elements to occur at progressively later points in accordance with the progressively more rapid opening movement of the engine throttle.

11. Clutch-operating mechanism for motor vehicles including a clutch and a throttle for the vehicle engine comprising a power device connected to the vehicle clutch, and control means operative upon movement of the engine throttle to idling position for rendering the power device operative for disengaging the clutch, and operative upon movement of the throttle toward open position for successively releasing the clutch elements for movement toward operative engagement, checking the movement of the clutch elements at a point prior to operative engagement, and then further releasing the clutch elements for movement into operative engagement, said control means including a member connected to the engine throttle and movable in one direction upon closing movement of the throttle and in the other direction upon opening movement of the throttle, and a second member movable in accordance with the degree of actuation of the power device, such second member being movable in said first named direction upon the actuation of the power device and in the second named direction upon the deactuation of the power device, said second named member being movable in the last named direction into cooperative relationship with the first named member to check the releasing of the clutch elements.

12. Clutch-operating mechanism for motor vehicles including a clutch and a throttle for the vehicle engine comprising a power device connected to the vehicle clutch, and control means operative upon movement of the engine throttle to idling position for rendering the power device operative for disengaging the clutch, and operative upon movement of the throttle toward open position for successively releasing the clutch elements for movement toward operative engagement, checking the movement of the clutch elements at a point prior to operative engagement, and then further releasing the clutch elements for movement into operative engagement, said control means including a shiftable member, and a control member movable in one direction upon the actuation of the power device and in the other direction upon the releasing of the power device, said control member being movable in the last named direction into cooperative relationship with said shiftable member to check the releasing of the power device, and means for moving said shiftable member in the last named direction upon movement of the engine throttle, to cause the point of cooperative relationship of said members to occur progressively later in accordance with the progressively more rapid opening movement of the throttle.

13. Clutch-operating mechanism for motor vehicles including a clutch and a throttle for the vehicle engine comprising a pressure responsive power device connected to a motor vehicle clutch and operative for moving the clutch elements out of engagement with each other, and control means for determining the connection of said power device with a source of differential pressure and the atmosphere, said control means being operable upon movement of the engine throttle to idling position for connecting the power device to the source of differential pressure to disengage the clutch, and operative upon movement of the throttle toward open position for variably connecting the power device to the atmosphere for successively releasing the clutch elements for movement toward operative engagement, checking the movement of the clutch elements at a point prior to operative engagement, and then further releasing the clutch elements for movement into operative engagement, said control means being operative for tending to disconnect the power device from the atmosphere for checking the movement of the clutch elements at progressively later points in accordance with the progressively more rapid opening movement of the engine throttle.

14. Clutch-operating mechanism for motor vehicles including a clutch and a throttle for the vehicle engine comprising a pressure responsive power device connected to a motor vehicle clutch and operative for moving the clutch elements out of engagement with each other, and control means for determining the connection of said power device with a source of differential pressure and the atmosphere, said control means being operable upon movement of the engine throttle to idling position for connecting the power device to the source of differential pressure to disengage the clutch, and operative upon movement of the throttle toward open position for variably connecting the power device to the atmosphere for successively releasing the clutch elements for movement toward operative engagement, checking the movement of the clutch elements at a point prior to operative engagement, and then further releasing the clutch elements for movement into operative engagement, said control means including a pair of cooperating valves one movable in accordance with the position of the engine throttle and the other in accordance with the degree of actuation of the power device, said second named valve being biased in one direction and progressively releasable for movement in such direction upon the progressive connection of the power device with the atmosphere to tend to move into a neutral position with respect to said first named valve to disconnect the power device from the atmosphere.

15. Clutch-operating mechanism for motor vehicles including a clutch and a throttle for the vehicle engine comprising a pressure responsive power device connected to a motor vehicle clutch and operative for moving the clutch elements out of engagement with each other, and control means for determining the connection of said power device with a source of differential pressure and the atmosphere, said control means being operable upon movement of the engine throttle to idling position for connecting the power device to the source of differential pressure to disengage the clutch, and operative upon movement of the throttle toward open position for variably connecting the power device to the atmosphere for successively releasing the clutch elements for movement toward operative engagement, checking the movement of the clutch elements at a point prior to operative engagement, and then further releasing the clutch elements for movement into operative engagement, said control means including a valve controlled by the engine throttle and movable in one direction upon closing movement of the throttle and in the other direction upon opening movement thereof, and a second valve movable in accordance with the degree of actuation of the power device, said second named valve being movable in said first named direction upon actuation of the power device and in the second named direction upon the connection of the power device to the atmosphere to release the power device, said second named valve being movable in the last named direction to tend to assume a neutral relationship with the first named valve to disconnect the power device from the atmosphere and check the releasing of the clutch elements.

16. Clutch-operating mechanism for motor vehicles including a clutch and a throttle for the vehicle engine comprising a power device connected to the vehicle clutch, and control means operative upon movement of the engine throttle to idling position for rendering the power device operative for disengaging the clutch, and operative upon movement of the throttle toward open position for successively releasing the clutch elements for movement toward operative engagement, checking the movement of the clutch elements at a point prior to operative engagement, and then further releasing the clutch elements for movement into operative engagement, said control means being operative through a range of movement of the engine throttle adjacent the idling position thereof for releasing the pressure of the clutch plates substantially in proportion to the engine torque.

17. Clutch-operating mechanism for motor vehicles including a clutch and a throttle for the vehicle engine comprising a power device connected to the vehicle clutch, and control means operative upon movement of the engine throttle to idling position for rendering the power device operative for disengaging the clutch, and operative upon movement of the throttle toward open position for successively releasing the clutch elements for movement toward operative engagement, checking the movement of the clutch elements at a point prior to operative engagement, and then further releasing the clutch elements for movement into operative engagement, said control means including a member connected to the engine throttle and movable in one direction upon closing movement of the throttle and in the other direction upon opening movement of the throttle, and a second member movable in accordance with the degree of actuation of the power device, such second member being movable in said first named direction upon the actuation of the power device and in the second named direction upon the de-actuation of the power device, said members being movable in cooperative relationship through a range of movement of the engine throttle adjacent the idling position thereof for releasing the pressure of the clutch plates substantially in proportion to the engine torque.

18. Clutch-operating mechanism for motor vehicles including a clutch and a throttle for the vehicle engine comprising a power device connected to the vehicle clutch, and control means operative upon movement of the engine throttle to idling position for rendering the power device operative for disengaging the clutch, and operative upon movement of the throttle toward open position for successively releasing the clutch elements for movement toward operative engagement, checking the movement of the clutch elements at a point prior to operative engagement, and then further releasing the clutch elements for movement into operative engagement, said control means including a shiftable member, and a control member movable in one direction upon the actuation of the power device and in the other direction upon the releasing of the power device, said control member being movable in the last named direction into cooperative relationship with said shiftable member to check the releasing of the power device, and means for moving said shiftable member in the last named direction upon movement of the engine throttle, said members being movable in cooperative relationship through a range of movement of the engine throttle adjacent the idling position thereof for releasing the pressure of the clutch plates substantially in proportion to the engine torque.

19. Clutch-operating mechanism for motor vehicles including a clutch and a throttle for the vehicle engine comprising a pressure responsive power device connected to a motor vehicle clutch and operative for moving the clutch elements out of engagement with each other, and control means for determining the connection of said power device with a source of differential pressure and the atmosphere, said control means being operable upon movement of the engine throttle to idling position for connecting the power device to the source of differential pressure to disengage the clutch, and operative upon movement of the throttle toward open position for variably connecting the power device to the atmosphere for successively releasing the clutch elements for movement toward operative engagement, checking the movement of the clutch elements at a point prior to operative engagement, and then further releasing the clutch elements for movement into operative engagement, said control means being operative during a range of movement of the engine throttle adjacent the idling position thereof for varying the pressure in said power device to release the pressure of the clutch plates substantially in proportion to the engine torque.

20. Clutch-operating mechanism for motor vehicles including a clutch and a throttle for the vehicle engine comprising a pressure responsive power device connected to a motor vehicle clutch and operative for moving the clutch elements out of engagement with each other, and control means for determining the connection of said power device with a source of differential pressure and the atmosphere, said control means being operable upon movement of the engine throttle to idling position for connecting the power device to the source of differential pressure to disengage the clutch, and operative upon movement of the throttle toward open position for variably connecting the power device to the atmosphere for successively releasing the clutch elements for movement toward operative engagement, checking the movement of the clutch elements at a point prior to operative engagement, and then further releasing the clutch elements for movement into operative engagement, said control means including a valve controlled by the engine throttle and movable in one direction upon closing movement of the throttle and in the other direction upon opening movement thereof, and a second valve movable in accordance with the degree of actuation of the power device, said second named valve being movable in said first named direction upon actuation of the power device and in the second named direction upon the connection of the power device to the atmosphere to release the power device, said valves cooperating with each other through a range of movement of the engine throttle adjacent to the idling position thereof for varying the pressure in said power device to release the pressure of the clutch plates substantially in proportion to the engine torque.

21. Clutch-operating mechanism for motor vehicles including a clutch and a throttle for the vehicle engine comprising a pressure responsive power device connected to a motor vehicle clutch and operative for moving the clutch elements out of engagement with each other, and control means for determining the connection of said power device with a source of differential pressure and the atmosphere, said control means being operable upon movement of the engine throttle to idling position for connecting the power device to the source of differential pressure to disengage the clutch, and operative upon movement of the throttle toward open position for variably connecting the power device to the atmosphere for successively releasing the clutch elements for movement toward operative engagement, checking the movement of the clutch elements at a point prior to operative engagement, and then further releasing the clutch elements for movement into operative engagement, said control means including a pair of cooperating valves, one controlled in accordance with the position of the engine throttle and the other in accordance with the degree of actuation of the power device, said first named valve being movable in one direction to connect the power device to the source of differential pressure and in the other direction to connect the power device to the atmosphere, said second named valve being movable in said first named direction upon actuation of the power device and in the second named direction upon the connection of the power device to the atmosphere, said valves cooperating with each other through a range of movement of the engine throttle adjacent to the idling position thereof for varying the pressure in said power device to release the pressure of the clutch plates substantially in proportion to the engine torque.

22. In an apparatus for controlling the operation of a friction clutch normally biased toward closed position and adapted to be installed in the transmission line of an automobile provided with a manually operable throttle controlling member, the combination of a cylinder which is adapted to be mounted on an automobile and which is closed at one end and provided with a port in its walls adapted to connect its said closed end to the intake manifold of such automobile, a piston reciprocable in said cylinder and adapted to be operatively connected to a clutch actuating member of such automobile, and valve mechanism comprising a second cylinder open at both ends and reciprocable endwise within said first mentioned one, which is provided with a port in its side walls capable of interconnecting its interior with a portion of the interior of said first mentioned cylinder, and a member for controlling said port which is reciprocable with reference to both said cylinders, together with means for moving one of said last mentioned two reciprocable elements coincidentally with said piston, and mechanism adapted to move the other one coincidentally with the movements of the throttle controlling member of any automobile on which the apparatus has been installed.

23. In a vacuum actuated servomotor for opening and closing clutches on motor cars, the combination of a cylindrical casing closed at one end except for an outlet adapted to be connected to the intake manifold of a car engine and adapted to be pivoted on such car, a piston reciprocable within said cylinder adapted to be connected to a clutch operating member of such motor car, and a valve mechanism located in said casing interior and comprising two relatively movable parts, one of which is in the form of a cylinder having a port in its side wall and open at one end to the atmosphere while its other end opens into the interior of the closed end of said casing, and the other of which is of a cylindrical form, has a sliding fit in said last mentioned cylinder and is adapted to open or close said port; said casing having a portion of its interior remote from its closed end so located that said cylinder port opens into it, together with means for moving one of said valve parts coincidentally with movements of said piston and mechanism adapted to operatively connect the other with the accelerator of any motor car on which said casing may be mounted.

24. In a pneumatic apparatus for actuating the clutch pedal of a motor car comprising a cylinder open to the atmosphere at one end and connected through a port near its closed end to the intake manifold of the motor, a piston in said cylinder connected to said clutch pedal member, and a spring normally tending to produce a clutch engaging movement of said pedal, the combination, with said above described apparatus, of automatic means adapted to produce a relatively rapid initial clutch engaging movement of said clutch pedal followed by a slower completion thereof comprising two ports in said cylinder walls, one located at a point intermediate of the ends thereof and the other near the port to the intake manifold connection, a conduit extending between said last mentioned ports, and a manually movable sleeve in said cylinder which surrounds said piston and, when reciprocated, is adapted to either open said intake manifold port and close the others or to close said intake manifold port and open both the other ports, the parts being so adjusted relatively each to the other that a predetermined amount of clutch engaging movement of the piston will cut off access of the atmosphere to said port nearest the open end of said cylinder.

JAMES H. K. McCOLLUM.
H. J. DE N. McCOLLUM.